Patented Mar. 24, 1925.

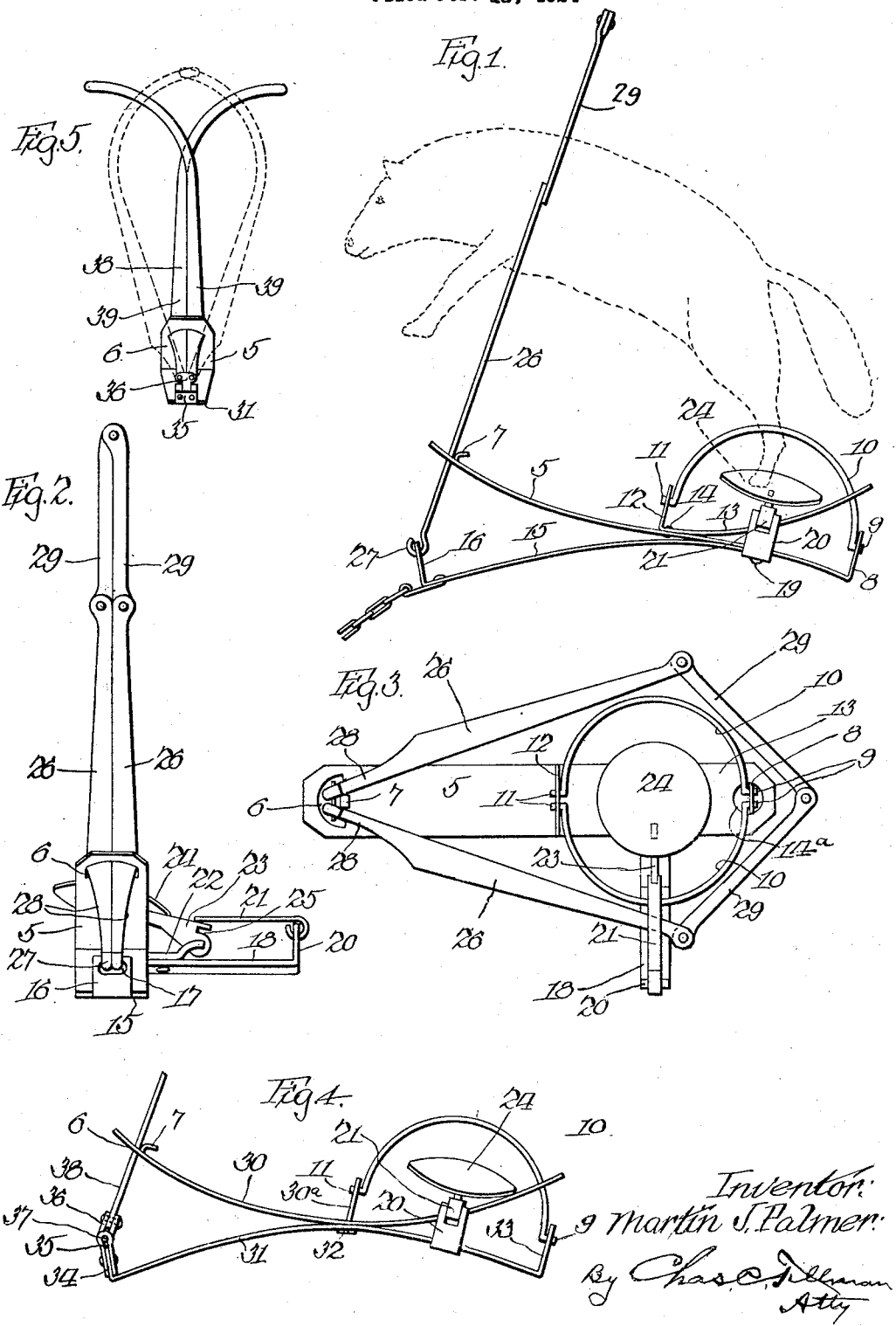

1,531,021

UNITED STATES PATENT OFFICE.

MARTIN J. PALMER, OF CHICAGO, ILLINOIS.

ANIMAL TRAP.

Application filed February 18, 1924. Serial No. 693,461.

*To all whom it may concern:*

Be it known that I, MARTIN J. PALMER, a subject of the Kingdom of Sweden, residing at Chicago, in the county of Cook and State of Illinois, have invented certain new and useful Improvements in Animal Traps, of which the following is a specification.

This invention relates, generally, to traps used for catching animals, but has particular relation to that type of such traps in which a pair of spring-actuated jaws are employed in connection with a trigger used for holding said jaws open and releasing the same when depressed by the action of the animal, the said jaws acting to grip or clamp between them a part of the animal when the trigger is sprung, such as one of its legs, or its head.

The above mentioned type of animal traps usually captures the animal in such a way that it remains alive, thus causing it to suffer pain as well as enabling it to gnaw off its leg above the point thereof held by the jaws and thus effect its escape.

My improvement employed in connection with the above mentioned spring-actuated jaws and trigger for holding and releasing the same, provides means for quickly slaying or killing the animal after it has sprung the trigger of the trap, thus avoiding cruelty to the animal and preventing its escape by self-mutilation as above mentioned.

The principal object of the invention is the provision of an animal trap of such construction as to provide not only means for capturing the animal by gripping or clamping a portion of its body but in addition means for surrounding and clamping the body of the animal with such force and at such a position as to interfere with its breathing and thus cause the quick death of the animal.

A further object of the invention is the provision of means in the construction thereof whereby certain parts may be detached from other parts so as to enable the trap to be easily carried or placed in a compact form.

Other objects and advantages of the invention will be disclosed in the following description and explanation which will be more readily understood when read in conjunction with the accompanying drawing, in which several embodiments of which the invention is susceptible are illustrated, it being understood that modifications and changes may be resorted to without a departure from the spirit of the appended claims.

In the drawing,—

Fig. 1 is a view in side elevation of a trap embodying one form of the invention, illustrating the parts thereof in about the positions they will occupy after the animal has sprung the trigger of the trap, and been caught by the gripping jaws thereof and by the killing or slaying clamping member of the trap.

Fig. 2 is a front view in elevation of the parts of the trap positioned as shown in Fig. 1 with the body of the animal omitted.

Fig. 3 is a plan view showing the parts of the trap in the positions they will occupy when the trap is set.

Fig. 4 is a fragmental view in side elevation illustrating a modification in the construction of the springs of the trap, and Fig. 5 is a front view of a modified form of the killing or slaying clamping element illustrating a modification in the manner of mounting the same.

Like numerals of reference refer to corresponding parts throughout the different views of the drawing.

Referring now more particularly to Figs. 1 and 2 of the drawing, the reference numeral 5 designates the main or principal spring of the trap, which spring as shown has at one of its ends, which may be for convenience designated as the front end thereof, a transversely disposed slot 6 and at the rear edge of said slot with an upwardly and slightly rearwardly extended tongue or flap 7 employed for the purpose to be presently explained. The opposite or rear end of the main spring 5 is provided with an up-turned extension 8, which extension is furnished with a pair of openings located side by side for the reception and operation of the trunnions or journals 9 on the rear end of each of the curved gripping jaws 10, which jaws each has at its other or front end a trunnion or journal 11 which are journaled in openings located side by side in an upward extension 12 on the front end of an auxiliary spring 13, which like the spring 5, is made of a flat strip of steel. The front end of the auxiliary spring 13 is secured to the upper surface of the spring 5 by means of rivets 14 or otherwise, at about the middle of the spring 5, as is clearly shown in Figs. 1 and 3 of the drawing. The spring 13 is provided near its rear end with an opening 14ª of a size to surround the rear lower portion of the jaws 10 just above their journals 9 yet in such a way as to cause said jaws to be moved towards each other and firmly held in such position when under the tension of the spring 13 after it has been released by the depression of the trigger of the trap.

About midway between the extension 8 on the rear end of the main spring 5 and the extension 12 at the front end of the auxiliary spring 13, the rear end of another spring 15 which is substantially flat is secured, the front end of which is provided with an upward extension 16 having a slot or opening 17 in its upper portion. The auxiliary spring 15 lies directly under the main spring 5 and extends forwardly for about the same distance. Transversely mounted on the lower surface of the main spring 5 is a laterally extended bracket 18 which may be secured to the spring 5 by means of the same rivets 19 used for securing the rear end of the spring 15 to the rear portion of the spring 5 as will be understood by reference to Fig. 1 of the drawing. The bracket 18 comprises an upward extension 20 located at its free end, and said extension has pivotally secured to its upper end the outer end of a locking link 21 which is adapted to lie directly over the horizontal portion of the bracket 18 at a slight distance thereabove.

Mounted on the upper surface of that portion of the bracket 18 adjacent one edge of the spring 5, is another laterally extended bracket 22 which has pivotally secured to its outer portion or free end a trigger 23 which comprises a bait pan or plate 24 mounted on the end of the trigger 23 opposite its pivot point and extended substantially in a horizontal plane over the auxiliary spring 13 as shown in Figs. 1 to 3 inclusive. The trigger 23 has just above its pivot point a recess or notch 25 for engagement with the free end of the locking link 21 when it is desired to set the trap.

An important feature of my invention includes the clamping element for the body of the animal, which consists of a pair of bars 26 each of which has at its lower end a hook 27 to engage the extension 16 through an opening therein on the front end of the main spring. These hooks are preferably formed so that the bars 26 can be detached from the extension 16 if desired, yet they may be clinched so as to be permanently yet loosely mounted on said extension. As shown in Fig. 2, the clamping bars 26 have their lower portions downwardly tapered as at 28 and are extended upwardly through the opening 6 in the front end of the main spring. This opening is of such size as to cause the bars 26 to approach each other in close juxtaposition if not in contact, when the main spring exerts its tension on said bars, which will occur after the trigger of the trap has been sprung. Pivotally connected at one of its ends to the upper end of each of the bars 26 is a link 29 which are pivotally connected at their opposite ends, thus affording a jointed clamping element used for slaying the animal caught in the trap.

In Fig. 4 is illustrated a modification in the arrangement of the actuating springs of the device, which modified form may be substituted for the construction shown in Fig. 1 and above described, if desired. This modification consists of two flat steel springs 30 and 31, located one above the other and fastened together at about their middles by rivets 32 or otherwise. In this modification the springs 30 and 31 are oppositely curved as shown and the rear end of spring 30 is provided with a slot or opening through which the jaws 10 are extended, the rear ends of said jaws being journaled in an extension 33 in a similar manner to that shown in Fig. 1 and above described. The front end of the spring 30 is provided with a slot or opening for the reception and operation of the slaying clamping element which in the present instance is shown as being of the same construction as that illustrated in Fig. 5, the description of which will herein follow. At the rear edge of the opening in the front end of the spring 30 the said spring is provided with a tongue or flap 7 as in the other construction, and for a similar purpose. The front end of the spring 31 has an upward extension 34 to which is riveted a strap 35 to the upper portion of which is hinged the lower portion of a strap 36, which strap, as well as the strap 35, is of loop form and said straps are connected together by a pintle 37 which may be removed when it is desired to detach the slaying clamping element designated as a whole by the numeral 38, see Figs. 4 and 5. In the modified construction shown in Fig. 4, the rear lower portion of the spring 31 has mounted thereon a bracket and upward extension 20 which carries a locking link 21 for co-operation with a trigger 24 all of the same construction as shown in Figs. 1 and 3 and above described.

The modified form of the slaying clamping element shown in Figs. 4 and 5 but more clearly in Fig. 5, consists of two members 39 located side by side but oppositely curved at their upper ends. These members or bars are arranged so as to overlap each other when in their clamping positions, but when opened, will be positioned so as to encompass the clamping jaws. The lower portion of the members or bars 39 extend through the opening 6 in the spring 5 when this modified form is used in connection with the main spring 5 of Fig. 1, and through a similar opening 6 in the spring 30 when used in connection with the modified form of springs shown in Fig. 4 of the drawings. As the bars 39 are tapered towards their lower ends similar to the construction of the bars 26 of the jointed form of the slaying clamping element, it is manifest that when the front end of the spring engaging said members is depressed, they can be moved laterally with respect to one another and will lie in horizontal positions on either side of the clamping jaws.

The operation is simple and as follows:

To set the trap, assuming that the parts are in the positions shown in Figs. 1, 2, 4 and 5, it is only necessary to depress the front end of the main or upper spring of the base of the device until the upward extension on the front end of the lower spring of said base is extended through the opening 6 of the main or upper spring, when it is manifest that the loose connection of the bars of the slaying clamping element, with the upward extension at the front end of the lower spring of the base, will permit said bars to be separated and to lie in a horizontal position as shown in Fig. 3, so as to encompass or embrace the clamping jaws. This operation is common to both constructions of the slaying clamping element. When thus positioned, one of the bars of said element, whether of the construction shown in Fig. 1, or that of Fig. 5, will lie between the extension 20 of the bracket 18 and the adjacent end of the trigger 23. Now, by placing the locking link 21 over said bar and in engagement with the notch 25 of said trigger, it is manifest that the clamping element will be held in its horizontal position. It will be understood that the clamping jaws 10 should also be turned from each other to about the position shown in Fig. 3, when it is manifest that one of said jaws will lie between the trigger 23 and the adjacent bar of the slaying clamping member, in which position said jaw will be held by means of the locking link 21. When the parts have been thus positioned, the trap is set and may be placed in the path-way of fur-bearing animals or where they are likely to pass and may be covered with leaves or light trash so as to conceal the same. Upon depression of the trigger plate 24 by the foot of an animal, it is manifest that the trigger 23 will be disengaged from the locking link 21, thus releasing the clamping jaws and at the same time the bars of the slaying clamping element, and permitting the tension of the main spring to be exerted on the bars of the slaying clamping element, thereby causing said element to be elevated, and its members tightly closed on the body of the animal in about the position shown in Fig. 1, that is, if the animal should be traveling in the direction shown. The force of the main spring exerted on the bars of the slaying clamping element will cause said bars to grip the animal with such force as to interfere with its breathing, if not to stop its breathing. The springs of the device constitute its base above referred to, and the lower springs together with the laterally extended bracket 18, will serve to assist in keeping the trap in an upright position.

By employing the tongue 7 or upward projection at the rear side of the slot 6 in the main or upper spring of the base, it will be understood that when the bars of the slaying element are positioned as shown in Fig. 3, they will stride the projection 7 and after the trigger has been sprung to permit spring tension to be exerted on the bars of the said element, the said bars will be held apart until they are elevated to such an extent as to be freed from the projection 7 at this time allowing them to close on the body of the animal. By this arrangement, closure of the bars in their pivotal upward movement at a time to interfere with the jaws 10, is obviated.

Having thus fully described my invention, what I claim as new and desire to secure by Letters Patent is:

1. In an animal trap, the combination with a pair of spring-actuated co-operating jaws, of a spring-actuated slaying clamping element loosely supported at one of its ends near said jaws for bodily vertical movement and adapted to be positioned in substantially a horizontal plane and to embrace said jaws, and trigger-controlled means for holding said jaws and said clamping element against spring tension in their set or open positions.

2. In an animal trap, the combination with a pair of spring-actuated co-operating jaws, of a spring-actuated slaying clamping element loosely supported at one of its ends near said jaws for bodily vertical movement and adapted to be positioned in substantially a horizontal plane and to embrace said jaws, means for releasably holding said jaws and said clamping element against spring tension in their set or open positions, and a trigger co-operating with said holding means and located within the space enclosed by said jaws when the latter are in their open positions.

3. In an animal trap, the combination with a base including a plurality of superimposed bow-springs, the uppermost one having an opening near one of its ends and the one under the same provided at its ends adjacent said opening with an upward extension, of a slaying clamping element comprising at least a pair of bars loosely connected at their lower ends to said extension and extended through said opening, a pair of co-operating jaws pivotally mounted on the base for actuation by said springs, said slaying clamping element adapted to be positioned in a substantially horizontal plane and to embrace said jaws, and trigger-controlled means for holding said jaws and said clamping element against spring tension in their set or open positions.

4. In an animal trap, the combination with a base including a plurality of superimposed springs, the uppermost one having an opening near one of its ends and the one directly under the same provided at its end adjacent said opening with an upward extension, of a slaying clamping element comprising at least a pair of bars located alongside of one another and loosely connected at their lower ends to said extension, said bars extended through said opening for movement therein, a pair of co-operating jaws pivotally mounted on the base for actuation by said springs, said slaying clamping element adapted to be positioned in a substantially horizontal plane and to embrace said jaws, means for holding said jaws and said clamping element against spring tension in their set or open positions, and a trigger co-operating with said holding means and located within the space enclosed by said jaws when the latter are in their open positions.

5. In a device of the class described, the combination with a base including a pair of springs mounted one above the other, the upper of said springs having an opening near one of its ends, of a slaying clamping element comprising at least two bars located alongside of one another and loosely connected at their lower ends to the said lower spring adjacent the opening in the other spring, said bars extended through said opening for movement therein, said slaying clamping element adapted when depressed at its upper end to be positioned in a substantially horizontal plane with the bars thereof separated, and trigger-controlled means for holding said clamping element against the tension of said springs while said bars are in their separated positions.

6. In a device of the class described, the combination with a base including a pair of springs mounted one above the other, the upper of said springs having a transverse opening near one of its ends and provided with an upwardly extended tongue on one side of said opening, of a slaying clamping element comprising at least two bars located alongside of one another and loosely connected at their lower ends to the said lower spring adjacent the opening in the other spring, said bars having their lower portions reduced and extended through said opening for movement therein, said slaying clamping element adapted when depressed at its upper end to be positioned in a substantially horizontal plane with the bars thereof separated and astride said tongue, and trigger-controlled means for holding said clamping element against the tension of said springs while said bars are in their separated positions.

MARTIN J. PALMER.